United States Patent Office 2,798,863
Patented July 9, 1957

2,798,863

CHLORINATED ORGANOTIN RUBBERY COMPOSITIONS AND METHOD OF PREPARING THE SAME

Louis A. Tomka, Westfield, N. J., assignor to Metal & Thermit Corporation, New York, N. Y., a corporation of New Jersey No Drawing. Application April 7, 1954,
Serial No. 421,688

22 Claims. (Cl. 260—45.75)

The present invention relates to the stabilization of elastomers against the deleterious effects of aging, and especially the stabilization of rubbery compositions of the class consisting of natural rubber and synthetic polymers. Elongation, tensile strength, tackiness, etc., as well as other properties of elastomers are adversely affected by aging in the absence of stabilizers normally termed rubber antioxidants.

I have discovered that organotin compounds and especially organotin chlorides and oxychlorides having respectively the formulas (1) 

where $n$ is 1, 2, 3; and (2) 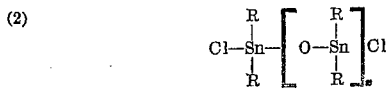

where $x$ is a whole number are effective as antioxidants for natural and synthetic rubbery compounds. In both Formulas 1 and 2 R represents alkyl, aryl, aralkyl and alkaryl constituents such as methyl ethyl, butyl, propyl, phenyl, tolyl, phenylethyl, diphenyl, benzyl, etc. R need not necessarily be identical in each occurrence.

Compounds coming under the above formulas include butyltin trichloride, trimethyl tin chloride, dibutyltin dichloride, diphenyltin dichloride, dilauryltin dichloride, dibenzyltin dichloride, dimethyltin oxychlorides, dibutyltin oxychlorides, diphenyltin oxychlorides, it being understood that the oxychlorides include many compounds with varying values of $x$.

In regard to the compositions under Formula 2, where $x$ is very high the compound essentially behaves as a diorganotin oxide. Where $x$ is 20 or less, the compounds are soluble in organic medium which may be a decided advantage over the pure organotin oxides in certain applications.

Compounds of the above type are extremely effective and especially at low concentration as illustrated by their stabilizing ability at .05% to 5% based on the weight of the rubber with a preferred range of .1 to 1% stabilizer based on the weight of the rubber.

These stabilizers are non-staining, and do not cause discoloration of rubber stocks as other antioxidants commonly do. This permits the manufacture of stable white stocks.

The stabilizers disclosed herein can be effectively used as anti-oxidants with elastomers and especially with rubbery materials of the class consisting of (a) natural rubber (b) rubber-like copolymers of 1,3 butadiene and styrene (GR-S type), (c) rubber-like polymers of 1,3 butadiene and acrylonitrile (nitrile type) and (d) rubber-like homopolymers of chloroprene (neoprene type).

The organotin compounds discussed herein may be milled into the rubbery materials defined above, without other additions, for the purpose of preventing degradation during storage. More commonly, they will be incorporated with other materials during compounding.

Any suitable compounding formulation may be employed. A specific example of a natural rubber composition, in which the organotin compounds described herein are effective as anti-oxidants is as follows:

| | Pts. by wt. |
|---|---|
| Thin, pale crepe | 100.0 |
| Zinc oxide (lead-free) | 5.0 |
| Stearic acid | 1.0 |
| Titanium dioxide (anatase) | 10.0 |
| Sulfur | 3.0 |
| Benzthiazole disulfide | 1.0 |
| Tetramethylthiuram disulfide | 0.1 |

To this composition may be added any of the organotin compounds coming under the general formulas set forth above, in proportions of 0.05% to 5% by weight, based on the weight of the rubber ingredient of said composition and preferably in the approximate 0.1% level. This compounded rubber composition containing the stabilizer is worked and blended by conventional techniques and vulcanized at 275° F. for twenty minutes in a hydraulic press.

Examples of typical stabilizers of this invention and illustrative percentages to be incorporated in the composition given above are as follows:

Formula 1

| | Parts |
|---|---|
| 1. Dibutyltin dichloride | .12 |
| 2. Dibutyltin dichloride | 1.0 |
| 3. Diphenyltin dichloride | .5 |

Formula 2

| | |
|---|---|
| 4. Dibutyltin oxychloride ($x$ is 4) | .12 |
| 5. Dibutyltin oxychloride ($x$ is 4) | 1.0 |
| 6. Dibutyltin oxychloride ($x$ is 20) | .5 |
| 7. Dimethyltin oxychloride ($x$ is 4) | .5 |

Rubber compositions incorporating the above antioxidants are non-staining.

Compositions may be prepared using GR-S rubber in place of the natural rubber in the above formulation with similar results.

The rubber compositions to be stabilized may contain quantities of pigments to impart any desired color or decorative effect to the final products. The stabilizer discussed herein will cause the rubber compositions to maintain their color whether black, white or any other color.

While the invention has been described with reference to various examples and embodiments, it will be apparent to those skilled in the art that various modifications may be made, and equivalents substituted therefor, without departing from the principles and true nature of the invention.

What is claimed is:

1. A rubber composition comprising as a principal ingredient a rubber selected from the class consisting of natural rubber and copolymers of 1,3 butadiene and styrene and a stabilizing amount of hydrocarbontin compound selected from the class consisting of hydrocarbontin chlorides of formula $$R_nSnCl_{4-n}$$

and hydrocarbontin oxychlorides of formula

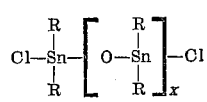

wherein R is a hydrocarbon radical selected from the class consisting of alkyl, aryl and aralkyl radicals, $n$ is a positive integer from 1 to 3 and X is a positive number no greater than 20.

2. A composition according to claim 1 wherein the composition is cured.

3. A composition according to claim 1 wherein said hydrocarbontin compound is present in the range of about .05 to 5% by weight based on rubber ingredient.

4. A rubber composition comprising as a principal ingredient a copolymer of 1,3 butadiene and styrene and a stabilizing amount of alkyltin chloride of formula $$R_nSnCl_{4-n}$$

wherein $n$ is a number from 1 to 3 and R is an alkyl radical.

5. A composition according to claim 4 wherein said alkyltin chloride is a dialkyltin dichloride.

6. A composition according to claim 5 wherein said dialkyltin dichloride is present in the amount of about .05 to 5% by weight based on the rubber ingredient.

7. A composition according to claim 6 wherein said dialkyltin dichloride is dibutyltin dichloride.

8. A composition according to claim 7 wherein said dibutyltin dichloride is present in the amount of .1 to 1% by weight based on rubber ingredient.

9. A rubber composition comprising as a principal ingredient a copolymer of 1,3 butadiene and styrene and a stabilizing amount of an arylhydrocarbontin chloride of formula $R_nSnCl_{4-n}$ wherein $n$ is a positive integer from 1 to 3 and R is an arylhydrocarbon radical.

10. A composition according to claim 9 wherein said arylhydrocarbontin chloride is a diarylhydrocarbontin dichloride.

11. A composition according to claim 10 wherein said diarylhydrocarbontin dichloride is present in the amount of about .05 to 5% by weight based on the rubber ingredient.

12. A composition according to claim 11 wherein said diarylhydrocarbontin dichloride is diphenyltin dichloride.

13. A composition according to claim 12 wherein said diphenyltin dichloride is present in the amount of about .1 to 1% by weight based on rubber ingredient.

14. A rubber composition comprising as a principal ingredient a copolymer of 1,3 butadiene and styrene and a stabilizing amount of an alkyltin oxychloride of formula

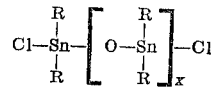

wherein R is an alkyl group and X is a positive integer no greater than 20.

15. A composition according to claim 14 wherein X is 4.

16. A composition according to claim 15 wherein said alkyltin oxychloride is present in the range of about .05 to 5% by weight based on rubber ingredient.

17. A composition according to claim 16 wherein said alkyltin oxychloride is a dibutyltin oxychloride of formula

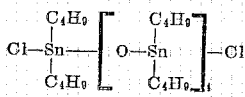

18. A composition according to claim 17 wherein said dibutyltin oxychloride is present in the range of about .1 to 1% by weight based on rubber ingredient.

19. A composition according to claim 14 wherein said alkyltin oxychloride is a dibutyltin oxychloride of formula

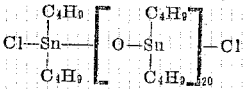

20. A composition according to claim 19 wherein said dibutyltin oxychloride is present in the amount of about .1 to 1% by weight based on rubber ingredient.

21. A composition according to claim 16 wherein said alkyltin oxychloride is a dimethyltin oxychloride of formula

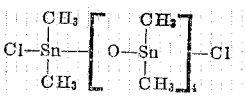

22. A composition according to claim 21 wherein said dimethyltin oxychloride is present in the amount of about .1 to 1% by weight based on rubber ingredient.

References Cited in the file of this patent

UNITED STATES PATENTS

| | | |
|---|---|---|
| 2,476,661 | Hart | July 19, 1949 |
| 2,604,460 | Mack | July 22, 1952 |
| 2,648,650 | Weinberg et al. | Aug. 11, 1953 |
| 2,679,506 | Rochow | May 25, 1954 |
| 2,690,435 | Albert | Sept. 28, 1954 |